US012110035B2

(12) United States Patent
Fahoum et al.

(10) Patent No.: US 12,110,035 B2
(45) Date of Patent: Oct. 8, 2024

(54) MAP BASED ANNOTATION FOR AUTONOMOUS MOVEMENT MODELS TRAINING

(71) Applicant: IMAGRY ISRAEL LTD., Haifa (IL)

(72) Inventors: Khaled Fahoum, Acre (IL); Suhail Habib, Haifa (IL); Ilan Shaviv, Shimshit (IL)

(73) Assignee: IMAGRY ISRAEL LTD., Haifa (IL)

( * ) Notice: Subject to any disclaimer, the term of this patent is extended or adjusted under 35 U.S.C. 154(b) by 237 days.

(21) Appl. No.: 18/052,922

(22) Filed: Nov. 6, 2022

(65) Prior Publication Data
US 2024/0149895 A1    May 9, 2024

(51) Int. Cl.
| *B60W 50/06* | (2006.01) |
| *B60W 50/00* | (2006.01) |
| *B60W 60/00* | (2020.01) |
| *G05B 13/04* | (2006.01) |

(52) U.S. Cl.
CPC ........ *B60W 50/06* (2013.01); *B60W 50/0097* (2013.01); *B60W 60/001* (2020.02); *G05B 13/048* (2013.01); *B60W 2552/53* (2020.02); *B60W 2554/20* (2020.02); *B60W 2554/404* (2020.02)

(58) Field of Classification Search
CPC .............. B60W 50/06; B60W 50/0097; B60W 60/001; B60W 2552/53; B60W 2554/20; B60W 2554/404; B60W 2554/4042; B60W 2554/4045; B60W 2556/40; B60W 60/00; G05B 13/048
See application file for complete search history.

(56) References Cited

U.S. PATENT DOCUMENTS

| 11,702,106 | B1* | 7/2023 | Poubel Orenstein ........................ G05D 1/0088 701/26 |
| 2017/0361726 | A1* | 12/2017 | Widmer ................. G01S 19/45 |
| 2019/0078896 | A1* | 3/2019 | Zhu ...................... G08G 1/0112 |
| 2021/0004017 | A1 | 1/2021 | Colgate et al. |
| 2022/0402520 | A1 | 12/2022 | Hetang et al. |

FOREIGN PATENT DOCUMENTS

CA    3134819 A1    10/2020

OTHER PUBLICATIONS

ISR and WO for PCT/IL2023/051051 (Jan. 11, 2024).

* cited by examiner

*Primary Examiner* — Behrang Badii

(57) ABSTRACT

A method, an apparatus and a computer program product for enhancing training of autonomous movement models based on map-based annotations. The method comprises augmenting an original training set with map based annotated modified scenarios at least one of which affects a path and at least one of which does not affect a path. The method comprises generating modified driving scenarios introducing a synthetic path altering object into the functional map representing the original movement or driving scenario, that induces a driving path that is different than the original path; and other modified driving scenarios that introduce a path non-altering object into the functional map of the original scenario, that the original path is applicable therein. An autonomous driving model for predicting driving path within a road segment based on a functional map representation is trained using the modified driving scenarios.

16 Claims, 5 Drawing Sheets

MAP BASED ANNOTATION FOR AUTONOMOUS MOVEMENT MODELS TRAINING

TECHNICAL FIELD

The present disclosure relates to generating autonomous movement models in general, and to enhancing training of autonomous movement models based on map-based annotations, in particular.

BACKGROUND

Control systems of autonomous vehicles are configured to identify appropriate navigation paths, obstacles and relevant signage, to help the vehicle control the autonomous movement, e.g., self-driving. At the core of control systems autonomous vehicles is a stack of perception modules whose purpose is to perceive the system's environment, reconstruct it and to make sense of it. The modern approach to environmental perception is to utilize specialized lightweight neural networks that can generate precise situational awareness models, which in turn could be used by other modules within the system to create motion plans, interact with the environment and ultimately navigate within it.

BRIEF SUMMARY

One exemplary embodiment of the disclosed subject matter is a method comprising: obtaining a first driving scenario that comprises a first functional map comprising at least a representation of a first non-synthetic static topology of a first road segment, whereby defining a first original driving path of a vehicle driving in the first road segment. The method further comprises receiving a first modified driving scenario and a first driving path, wherein the first driving path is applicable within the first modified driving scenario, wherein the first modified driving scenario is defined based on the first driving scenario, wherein the first modified driving scenario introduces a path altering object into the first functional map, wherein the path altering object is a synthetic object, wherein the path altering object induces the first driving path that is different than the first original driving path. The method further comprises obtaining a second driving scenario, wherein the second driving scenario comprises a second functional map comprising at least a representation of a second non-synthetic static topology of a second road segment, whereby defining a second original driving path of a vehicle driving in the second road segment. The method further comprises receiving a second modified driving scenario, wherein the second modified driving scenario introduces a path non-altering object into the second functional map, wherein the path non-altering object is a synthetic object, whereby the second original driving path is applicable in the second modified driving scenario. The method further comprises training an autonomous driving model, wherein the autonomous driving model is configured to provide a predicted driving path within a road segment based on a functional map representation of the road segment, wherein said training comprises: indicating to the autonomous driving model that the first driving path is applicable to the first modified driving scenario; and indicating to the autonomous driving model that the second original driving path is applicable to the second modified driving scenario, whereby augmenting an original training set with map based annotated modified scenarios at least one of which affects a driving path and at least one of which does not affect a driving path.

Optionally the method further comprises utilizing the autonomous driving model by an autonomous vehicle to determine a driving route in real-time.

Optionally, wherein the first non-synthetic static topology comprises at least one of: a road layer, a stop lines layer, a lane dividers layer, a signs layer and a speed bumps layer.

Optionally, the first functional map comprises at least one of: a static object layer representing static objects potentially physically blocking a path of the vehicle, a dynamic object layer representing dynamic objects with a movement vector, potentially colliding with the vehicle and an occlusion layer representing one or more occluded sections within the first road segment.

Optionally, the path altering object is a dynamic object having a syntactically defined movement vector, whereby the syntactically defined movement vector interfering with the first original driving path.

Optionally, the path altering object is a static object having a syntactically defined location within the first road segment, whereby the static object creating a physical interference reducing advisability of using the first original driving path.

Optionally, the path altering object is a modification to the first non-synthetic static topology that reduces advisability of using the first original driving path.

Optionally, the path altering object and the path non-altering object are identical.

Optionally the method further comprises receiving a third modified driving scenario and a third driving path, wherein the third driving path is applicable within the third modified driving scenario, wherein the third modified driving scenario is defined based on the third driving scenario, wherein the third modified driving scenario introduces a third path altering object into the first functional map, wherein the third path altering object is a synthetic object, wherein the third path altering object induces the third driving path that is different than the first original driving path and the first driving path; wherein said training further comprises: indicating to the autonomous driving model that the third driving path is applicable to the third modified driving scenario.

Optionally the method further comprises receiving a third modified driving scenario, wherein the third modified driving scenario introduces a third path non-altering object into the first functional map, wherein the third path non-altering object is a synthetic object, wherein a type of the third path non-altering object is similar to a type of the path altering object, whereby the first original driving path is applicable in the third modified driving scenario; wherein said training further comprises: indicating to the autonomous driving model that the first original driving path is applicable to the third modified driving scenario.

Optionally, in the third path non-altering object is identical to the path altering object, wherein a location of the third path non-altering object within the first functional map is different than a location of the path altering object within the first functional map.

Optionally, the first functional map further comprises a layer representing driving information of the vehicle in a most recent timeframe.

Optionally, the functional map representation of the road segment comprises an aggregated decision layer representing possible direction of applicable driving paths, wherein the aggregated decision layer comprises at least one of: a straight label, a left label and an all-paths label.

Optionally, the functional map representation represents an aggregation of multiple driving scenarios associated with the road segment.

Another exemplary embodiment of the disclosed subject matter is a computerized apparatus having a processor, the processor being adapted to perform the steps of: obtaining a first driving scenario, wherein the first driving scenario comprises a first functional map comprising at least a representation of a first non-synthetic static topology of a first road segment, whereby defining a first original driving path of a vehicle driving in the first road segment; receiving a first modified driving scenario and a first driving path, wherein the first driving path is applicable within the first modified driving scenario, wherein the first modified driving scenario is defined based on the first driving scenario, wherein the first modified driving scenario introduces a path altering object into the first functional map, wherein the path altering object is a synthetic object, wherein the path altering object induces the first driving path that is different than the first original driving path; obtaining a second driving scenario, wherein the second driving scenario comprises a second functional map comprising at least a representation of a second non-synthetic static topology of a second road segment, whereby defining a second original driving path of a vehicle driving in the second road segment; receiving a second modified driving scenario, wherein the second modified driving scenario introduces a path non-altering object into the second functional map, wherein the path non-altering object is a synthetic object, whereby the second original driving path is applicable in the second modified driving scenario; training an autonomous driving model, wherein the autonomous driving model is configured to provide a predicted driving path within a road segment based on a functional map representation of the road segment, wherein said training comprises: indicating to the autonomous driving model that the first driving path is applicable to the first modified driving scenario; and indicating to the autonomous driving model that the second original driving path is applicable to the second modified driving scenario, whereby augmenting an original training set with map based annotated modified scenarios at least one of which affects a driving path and at least one of which does not affect a driving path.

Yet another exemplary embodiment of the disclosed subject matter is a computer program product comprising a non-transitory computer readable storage medium retaining program instructions, which program instructions when read by a processor, cause the processor to perform a method comprising: obtaining a first driving scenario, wherein the first driving scenario comprises a first functional map comprising at least a representation of a first non-synthetic static topology of a first road segment, whereby defining a first original driving path of a vehicle driving in the first road segment; receiving a first modified driving scenario and a first driving path, wherein the first driving path is applicable within the first modified driving scenario, wherein the first modified driving scenario is defined based on the first driving scenario, wherein the first modified driving scenario introduces a path altering object into the first functional map, wherein the path altering object is a synthetic object, wherein the path altering object induces the first driving path that is different than the first original driving path; obtaining a second driving scenario, wherein the second driving scenario comprises a second functional map comprising at least a representation of a second non-synthetic static topology of a second road segment, whereby defining a second original driving path of a vehicle driving in the second road segment; receiving a second modified driving scenario, wherein the second modified driving scenario introduces a path non-altering object into the second functional map, wherein the path non-altering object is a synthetic object, whereby the second original driving path is applicable in the second modified driving scenario; training an autonomous driving model, wherein the autonomous driving model is configured to provide a predicted driving path within a road segment based on a functional map representation of the road segment, wherein said training comprises: indicating to the autonomous driving model that the first driving path is applicable to the first modified driving scenario; and indicating to the autonomous driving model that the second original driving path is applicable to the second modified driving scenario, whereby augmenting an original training set with map based annotated modified scenarios at least one of which affects a driving path and at least one of which does not affect a driving path.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
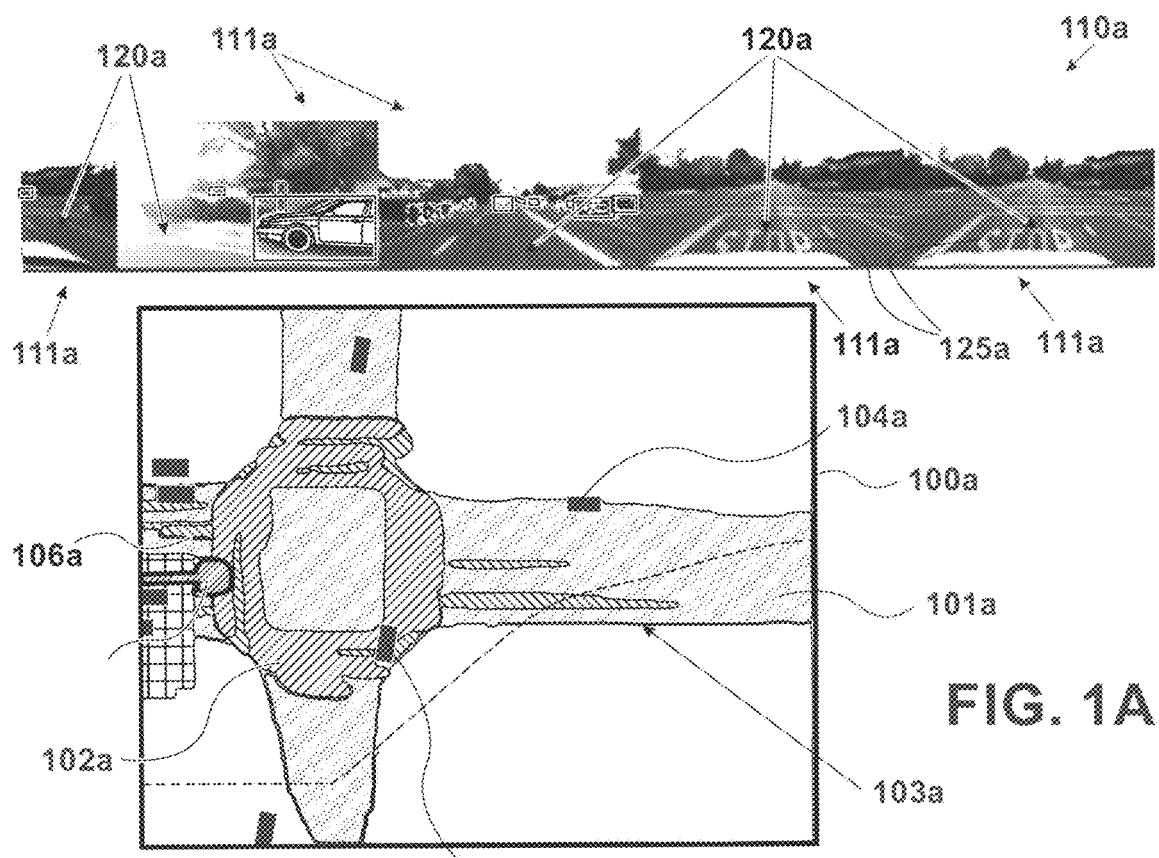
FIGS. 1A-1B show schematic illustration of exemplary functional map representation of a road segment, in accordance with some exemplary embodiments of the disclosed subject matter.

In the present disclosure, the term "autonomous vehicle" is to be broadly construed, unless otherwise noted, to cover any machine or vehicle that may have the ability to anonymously move, navigate, or the like, without the guidance of a human operator, driver, pilot, or the like. The term "autonomous vehicle" is not limited to specific forms of vehicles and is not to be construed in a manner limited only to vehicles that are utilized as a mode of transportation. The term "autonomous vehicle" should be construed to cover wheeled and un-wheeled vehicles, airborne vehicles, maritime vessels, submarines, or the like. For the avoidance of doubt, the term also covers autonomous aircrafts, autonomous airborne vehicles, Unmanned Aerial Vehicles (UAVs), drones, Unmanned Surface Vehicles (USVs), Unmanned Ground Vehicles (UGVs), self-driving cars, Autonomous Underwater Vehicles (AUVs), autonomous cargo ships, and legged robots.

The term "driving" in the present disclosure is to be broadly construed, unless otherwise noted, to cover any mode of movement of the autonomous vehicle. The term is not limited only to driving a wheeled vehicle, but also encompasses flying a UAV, piloting an aircraft, piloting a maritime vessel, or the like. Respectively, the term "road" in the present disclosure is not limited to a way for the conveyance of traffic of vehicles having a surface (e.g., paved way), but also encompasses any area in which the movement of the autonomous vehicle can occur. For example, and without limiting the scope of the present disclosure, the term "road" should be construed to cover a segment in the sea in which an Unmanned Surface Vehicle can sail, a surface on top which a legged robot can move, a 3D aerial volume in which a drone can fly, a 3D underwater volume in which an Autonomous Underwater Vehicle can dive, or the like.

The term "functional map" in the present disclosure is to be broadly construed, unless otherwise noted, to cover any type of maps or apparatus that represent the space in which the autonomous vehicle travers and the various obstacles or objects it may encounter or resign in that space. The term "functional map" is not limited to a specific type of maps and may cover a functional top-down map representation of the road segment, a functional map provided from a pre-defined perspective view, a three-Dimensional (3D) representing a 3D space or environment, rapid 3D maps, or the like. As an example, a top-down functional map representing the road segment may be utilized for autonomous vehicles. As another example, a 3D-functional map representing a flight area may be utilized for drones. As yet another, vertical maps may be utilized for wall crawling robots, or the like.

One technical problem dealt with by the disclosed subject matter is to provide accurate decision systems of self-navigation of autonomous vehicles. In some exemplary embodiments, decision systems of self-navigation of autonomous vehicles may be based on machine learning techniques, such as regression algorithms, decision matrix algorithms, Neural Networks, or the like. Decision systems may be configured to continuously render the surrounding environment, perceive the world, learn and plan, in real time, such as through Neural Networks, the best movement for the autonomous vehicle in order to provide an optimized navigation of the autonomous vehicle. The Neural Networks may be configured to learn, by observation and imitation, how to make real time data-driven complex decisions. However, the comprehension in perceiving the world through a neural network may be lack and incomplete, perception in many cases may not be reliable, as being may be prone to noise, artifacts and errors, may comprise false positives, and may be difficult to parse and analyze.

Another technical problem dealt with by the disclosed subject matter is to enhance the training phase of motion planning for decision systems of self-navigation of autonomous vehicles, in order to enable the system to navigate in new locations independently. In some exemplary embodiments, the greatest part of maturity efforts in autonomous driving systems may be spent on collecting and understanding training data. The training datasets utilized for training the system can be very big, as being sprawled over infinite space, however, may not be useful, as not covering all possible situations and locations, being generated by extra-careful drivers or based on strict rules, or the like. Autonomous driving systems may be required to handle real time data-driven complex decisions relying on observed environment. However, the systems may be unable to cope with unknown scenarios and may misbehave when the input diverges from their expected domains.

One technical solution is to augment exiting training sets with synthetically modified scenarios (e.g., data cases). Each scenario may comprise an aggregated inclusive representation of the environment as generated by the various perception modules of the autonomous vehicle. In some exemplary embodiments, existing driving scenarios may be modified by inserting one or more synthetic objects, some of which may change the driving path associated with the driving scenario (e.g., path altering objects) and other which may not. For each existing training set, one or more augmented training sets may be generated. In some exemplary embodiments, the augmented training set may comprise, in addition to original driving scenarios, one or more modified driving scenarios to which the associated original driving paths are applicable, as the inserted synthetic objects thereto are non-altering objects, e.g., objects that do not change the driving path. Additionally or alternatively, the augmented training set may further comprise one or more modified driving scenarios with modified driving path compared to the original driving paths, as the inserted synthetic objects thereto are path altering objects. Additionally or alternatively, each original training set may be augmented with modified scenarios at least one of which affects a driving path and at least one of which does not affect a driving path.

In some exemplary embodiments, the synthetically modified scenario may be generated manually, automatically, semi automatically, a combination thereof, or the like. As an example, the synthetically modified scenario may be created manually to simulate rare use cases, introducing abnormal scenarios, or the like. As another example, the synthetically modified scenario may be created automatically by performing rare permutations on objects or events in existing driving scenarios. It may be noted that such permutations may not be a simple change of parameter values, but a change of the objects or events represented in the scenario. As yet another example, the synthetically modified scenario may be created automatically be mixing synthetic driving data and non-synthetic driving data. As yet another example, the synthetically modified scenario may be generated by modifying a computational representation of an original driving scenario.

Additionally or alternatively, an annotation of the synthetically modified scenario, e.g., the synthetically added object being a path-altering object or not and how it alters the path, may be performed manually, automatically, semi automatically, a combination thereof, or the like. As an example, a spatial reasoning deep neural network may be utilized to automatically annotate synthetically modified scenarios according to how human drivers would have reacted. The network may be configured to extrapolate generalizations by drawing on the learned behavior to navigate through the modified driving scenario independently and determine the driving path. As another example, the annotation may be performed automatically in accordance with safe driving policy, such as defining a maximal physically allowed speed, rules defined based on domain range of physical limitations, or the like. It may be noted that the annotation may be configured to imitate real drivers or expert drivers' behavior. As an example, the driving scenario may be in a school area where the speed limit is 40 Km/h, but if there are many children, the maximum recommended speed will be 30 Km/h and not 40 Km/h, in accordance with what drivers would drive. As another example, the annotation or the modified driving path may comprise an "unconventional" behavior but a safer decision, such as running a traffic light to let an emergency vehicle pass or avoiding a crash with another vehicle, or the like.

It may be noted that the synthetically added object, both if being a path altering object or a non-altering object, may be a dynamic object (such as a pedestrian, a moving vehicle, or the like), or a static object (such as a road sign, a road element, parked cars, construction cones, bollards, fences, or the like). A dynamic path altering object may have a syntactically defined movement vector interfering with the original driving path. A static path-altering object may have a syntactically defined location within the road segment, in a manner creating a physical interference reducing advisability of using the first original driving path.

It may further be noted that the same object, or objects from the same type, may be a path altering object when synthetically added to one driving scenario, and a path non-altering object when synthetically added to another driving scenario. Additionally or alternatively, the same object may be a path altering object when synthetically added to one driving scenario in a certain location or a certain timing, and a path non-altering object when synthetically added to the same driving scenario in another location or another timing.

In some exemplary embodiments, an autonomous driving model may be configured to provide a predicted driving path within a road segment based on a functional map representation of the road segment enabling representing the driving scenario, such as but not limited to a functional top-down map representation of the road segment, a functional map provided from a predefined perspective view, a 3D map-representing a 3D space or environment, rapid 3D maps, or the like. As an example, a top-down functional map representing the road segment may be utilized for autonomous vehicles. As another example, a 3D-functional map representing a flight area may be utilized for drones. As yet another, vertical maps may be utilized for wall crawling robots, or the like. Additionally or alternatively, the functional map may be an apparatus that represents the space in which the autonomous vehicle travels, the various obstacles it may encounter in the space. In some exemplary embodiments, the augmented training set may be generated by modifying the functional map. The autonomous driving model may be trained using the augmented training set. In some exemplary embodiments, the training of the autonomous driving model may comprise indicating to the autonomous driving model that a new driving path is applicable to certain modified driving scenario, while indicating that an original driving path is applicable to another modified driving scenario. The autonomous driving model may be utilized by an autonomous vehicle to determine a driving route in real-time.

In some exemplary embodiments, driving scenarios may be represented using functional maps describing the road segment in which the scenarios occur and the possibilities of next actions or movements that can be performed by the autonomous vehicle. Each map may represent at least a non-synthetic static topology of the road segment, and define a driving path of the autonomous vehicle driving in the road segment. The non-synthetic static topology may comprise at least one of: a road layer representing the road on which the autonomous vehicle drives; layers representing elements associated with the road, such as a stop lines layer, a lane dividers layer, a speed bumps layer, or the like; layers representing varied traffic signage, such as a stop signs layer, traffic lights, or the like. Additionally or alternatively, the map may further represent dynamic elements, such as pedestrians, other vehicles, or the like.

In some exemplary embodiments, the functional road maps may be generated using real-time visual input, on the fly, based on sensor data captured by sensors mounted on the vehicles, such as cameras mounted on the front of the vehicle, LiDAR, odometry, inertial measurement units, or the like, may be utilized. In some exemplary embodiments, the functional road maps may comprise precise real-time information and true-ground-absolute accuracy. Additionally or alternatively, the functional road maps may be High Definition (HD) maps that are generated offline and dynamically updated based on real-time sensor data. In some exemplary embodiments, the functional road maps may be of higher resolution than maps found in current conventional resources, such as crowd-based road maps. The functional road maps may be utilized by the navigation system of autonomous vehicles. In some exemplary embodiments, the on-the-fly generated functional road maps may be utilized instead of the pre-prepared HD maps that can be correlated with the present environment of the vehicle based on location information, such as obtained using a GPS connection.

In some exemplary embodiments, the functional road maps may be vehicle-centered. The vehicle may be determined to be at a fixed location and orientation within the map. Additionally or alternatively, the functional road maps format may be functional. Each functional road map may comprise only the necessary information for a vehicle to safely navigate its environment. As an example, the information may comprise information required for lane determination, identification of a location to stop the vehicle, or the like. Additional information, such as relating to buildings that are sensed by the sensors, may be absent from the functional road map.

In some exemplary embodiments, the functional map may comprise static layers and dynamic layers. Each static layer may represent one or more types of static objects potentially physically blocking a path of the vehicle. Each dynamic layer may represent one or more types of dynamic objects with a movement vector, potentially colliding with the vehicle. Additionally or alternatively, the functional map may comprise one or more occlusion layers representing one or more occluded sections within the road segment. In some exemplary embodiments, the functional map may comprise a layer representing driving information of the vehicle in a most recent timeframe, such as a recent movement pattern of the vehicle, a recent driving action, a recent relative location, speed history of the vehicle, or the like Additionally or alternatively, layer representing driving information of the vehicle in a most recent timeframe may comprise environmental based parameters, such as traffic light color history, navigation instructions provided in the recent timeframe, environment comprehension based on modules external to the map, or the like. The time frame may be about 5 seconds, 10 seconds, 20 seconds, or the like. Additionally or alternatively, the functional map may comprise one or more layers representing driving and environmental information from a series of recent timeframes, that may be implemented as a raster. In some exemplary embodiments, modified driving scenarios may be generated by modifying the representation of the original driving scenario, such as modifying the map representing the original driving scenario. Each functional map representing a modified driving scenario may represent the non-synthetic static topology of the road segment as represented in the functional map representing the original driving scenario, and a representation of the synthetically added object. Each functional map representing a modified driving scenario may define a driving path of the autonomous vehicle driving in the road segment in accordance with the synthetically added object. In some exemplary embodiments, a path altering object may be a modification to the non-synthetic static topology that reduces advisability of using the first original driving path.

Additionally or alternatively, the functional map representation of the road segment may comprise an aggregated decision layer representing possible direction of applicable driving paths. The aggregated decision layer may comprise at least one path, defining one potential driving decision, such as "Keep Lane", "Turn Right", "Left Lane Switch", or the like. Additionally or alternatively, the functional map may represent an aggregation of multiple driving scenarios associated with the road segment. It may be noted that the functional map may be a dynamic map being updated in real time. Some layers of the functional map may not be changed, other layers may be changed. The aggregated decision layer may change, such as when the added object is a path altering object and may not change when the object does not affect the original driving path.

In some exemplary embodiments, the aggregated decision layer may be annotated manually, or semi-automatically, such as by adding points, dots, labels, pixels, or the like, representing possible decisions, movements, directions, or the like. An automatic trajectory or path may be generated based on the manually added points. Additionally or alternatively, the aggregated decision layer may be annotated automatically, using AI learning models, neural networks, using existing or dynamically trained autonomous driving models, or the like.

One technical effect of utilizing the disclosed subject matter is enhancing training of autonomous driving models. Training based on map-based annotation enables changing the natural environment to challenge the decision making. Such training enables to convey very small changes that may change the decision as if decided by experienced drivers. In addition, the disclosed training is immune to problems of regular learning, such as by training the models (e.g., the respective neural network) to ignore noise and artifacts, overcoming repetitious and futile cases, or the like.

Additionally or alternatively, the disclosed subject matter provides a contextual comprehension of the dynamic environment, unlike classical motion planning algorithms which may be required to perceive the dynamic environment, by motion-planning model itself or by an intermediate comprehension layer that is conceptually in the domain of perception, but is disjointed from it. Training based on map-based annotation enables un-necessitates the requirement to manually develop algorithms to classify the behavior of dynamic objects in the environment, classify the ego vehicle's "status" (as it were), or the like.

Another technical effect of utilizing the disclosed subject matter is to provide a solution to the infinitely complex problem of generating training datasets that cover all possible scenarios by transforming the problem from the algorithmic domain to the world of data. While previous solutions provide unmaintainable codebases that may become irrelevant in new environments, the disclosed subject matter enables to adapt the natural environments to any possible changes that may occur. Due to the way classic algorithms work, layering hundreds of rules one on top of the other may require meticulous attention to backwards compatibility. Due to the combinatorial explosion of cases, it may be guaranteed that handling one type of behavior will inadvertently degrade another. However, the disclosed subject matter solves the decision-making aspect of motion-planning using neural networks, thereby effectively translating driving scenarios to a data problem as opposed to a conceptual algorithmic problem.

Yet another technical effect of utilizing the disclosed subject matter is providing an automatic annotation tool that takes the programmer out of the equation. The onus of implicitly (or explicitly) classifying the behavior of various actors in the environment, as well as comprehending the situation of the ego vehicle may be transferred from the programmer to the annotator—who may be a human driver. This renders the problem tractable: every annotator knows how to "drive" given a certain situation. So instead of developing algorithms that will always have blind spots and will always cause degradation in existing behaviors, the disclosed subject matter may add varied data to the training set and place the responsibility for understanding the contextual classifications on the network.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1A showing a schematic illustration of an exemplary functional map representation of a road segment, in accordance with some exemplary embodiments of the disclosed subject matter.

In some exemplary embodiments, a Map 100a may be a functional road map, generated by an Artificial Neural Network (ANN) based on a Visual Input 110a. In some exemplary embodiments, Map 100a may be a top-down map. Visual Input 110a may comprise one or more Images 111a representing the Road Segment 120a in front of an autonomous Vehicle 130a, behind Vehicle 130a, around Vehicle 130a, or the like. Additionally or alternatively, Visual Input 110 may represent a view capturing Vehicle 130a, a surrounding environment thereof, or the like. In some exemplary embodiments, the ANN may be trained to detect road features and transform the input image space into a top view space in a single shot. The ANN may be configured to process Images 111a and generate Map 100a.

In some exemplary embodiments, Map 100a may be configured to be provided to an autonomous navigation system of Vehicle 130a. The autonomous navigation system may be utilized by the Vehicle 130a to perform the autonomous driving, such as for finding directional, correlating positions on the road, adjusting the route, or the like. The autonomous navigation system may autonomously drive Vehicle 130a in accordance with functional features represented by Map 100a.

In some exemplary embodiments, Map 100a may be a multilayer map comprising multiple accumulating layers, each of which represents different functional features. In some exemplary embodiments, the layers may represent functional features associated with road geometry, such as asphalt, lane dividers, crosswalks, parking lots, stop lines, speed bumps, or the like. Additionally or alternatively, the layers may represent functional features associated with static objects, such as cones, fences, generic static objects, traffic signs, traffic markers, traffic lights, or the like. Additionally or alternatively, the layers may represent functional features associated with objects that define traffic rules, such as traffic lights, stop signs, signs associated with specific instructions, such as "Give Way" signs (upturned triangle), "No-U-Turn" signs, "Left-Only arrow" signs, or the like, that may be further classified based on their status (e.g. green traffic lights), their relevancy to the ego vehicle (e.g. stop signs facing other driving lanes, No-Right-On-Red signs whose relevancy depend on our driving decision and intent), or the like. Additionally or alternatively, the layers may represent functional features associated with dynamic objects (e.g., other vehicles, pedestrians) such as brake lights, side blinkers, reverse lights or the like of other vehicles, pedestrian intent (e.g., is this human looking/gesturing/moving/sitting? what are they trying to communicate?), or the like. Additionally or alternatively, the layers may represent trajectories of dynamic objects, such as vehicles, pedestrians, motorcycles, bicycles, animals or the like.

In some exemplary embodiments, Map 100a may comprise, for each pixel, one or more features that are relevant to assisting the autonomous navigation of Vehicle 130a within Road Segment 120a. Such elements and features may comprise the road itself (101a) elements of the road (103a), road geometry, signs, vehicles or portions thereof (104a), obstacles, moving elements (105a), trajectories of dynamic objects, or the like. In some exemplary embodiments, each pixel in Map 100a may be associated with a predetermined relative position to Vehicle 130a. A content of each pixel in Map 100a may be assigned a set of values. Each value may be configured to represent a functional feature relating to a location at a corresponding predetermined relative position to the pixel. As an example, the functional feature may be a drivable road indication (101a), an available driving path indication (135b), a stop line indication (106a), a speed bump indication, a lane divider markings indication, or the like. The set of values assigned to each pixel in Map 100a may comprise at least two different functional features. Additionally or alternatively, Map 100a may be configured to demonstrate a driving decision. As an example, Map 100a may be configured to demonstrate a decision to stop at a Stop Sign 125a, using a short path 145a.

Figure 1B:
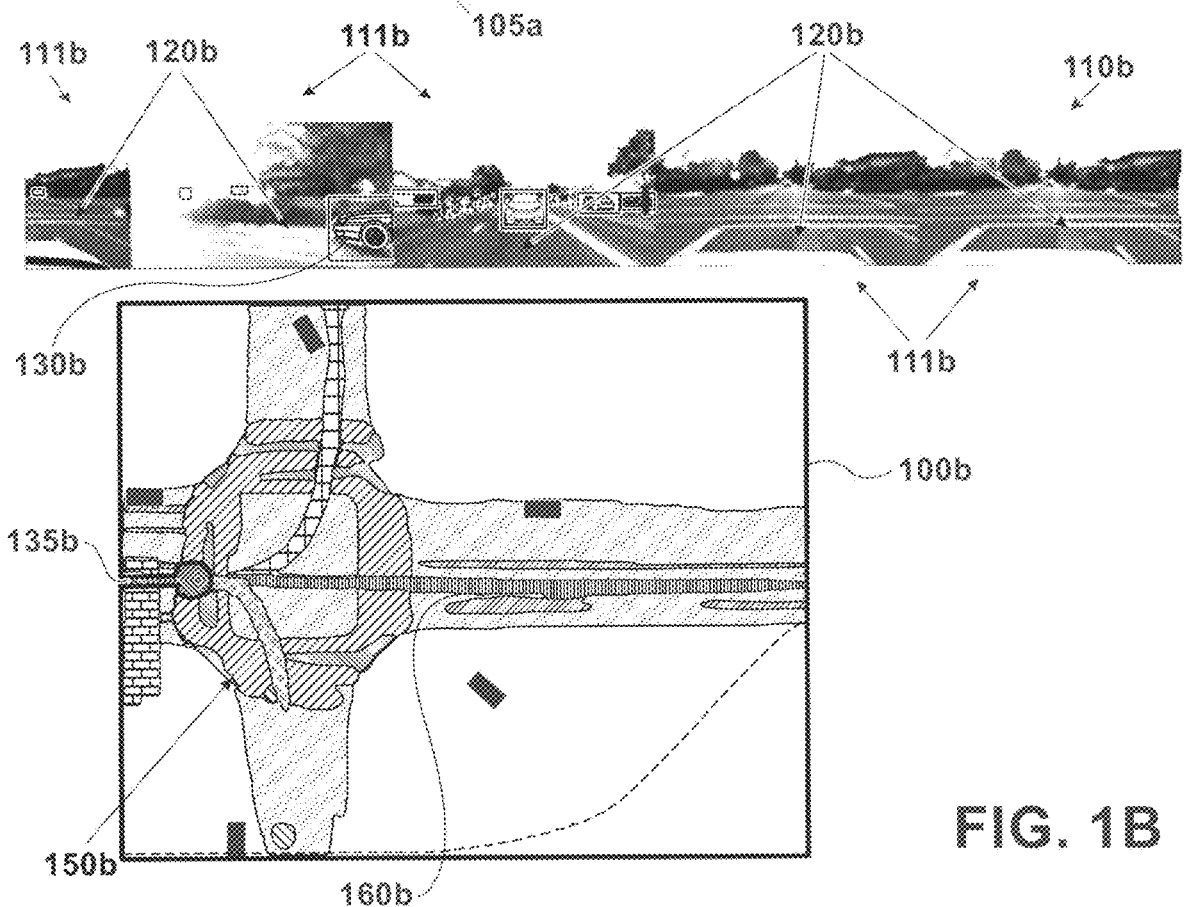

Referring now to FIG. 1B showing a schematic illustration of an exemplary functional map representation of a road segment, in accordance with some exemplary embodiments of the disclosed subject matter.

In some exemplary embodiments, a Map 100b may be a functional road map, similar to Map 100a. Map 100b may be a top-down map. Map 100b may be generated by an ANN based on a Visual Input 110b, that comprises one or more Images 111b representing Road Segment 120b surrounding of an autonomous Vehicle 130b. Vehicles 130a and 130b may be the same vehicle. Road Segment 120b may be similar or adjacent to Road Segment 120a, such as a successive segment of Road Segment 120a, a road segment in which Vehicle 130a (e.g., 130b) drives after Road Segment 120a, or the like.

In some exemplary embodiments, Map 100b may be configured to represent the driving environment in Road Segment 120b frame-by-frame while maintaining historic information across time. The historic information may be associated with trajectories or movement vectors of dynamic objects, movement pattern of the autonomous vehicle, or the like. Additionally or alternatively, Map 100b may be configured to represent latest frame profiles, such as vehicle speed profile (e.g., the vehicle's driving speed within the latest N seconds time window, where N may be 10 seconds, 20 seconds, 60 seconds, or the like), traffic light classification profile (e.g., state of all present traffic lights within the latest N seconds time window, where N may be 10 seconds, 20 seconds, 60 seconds), or the like.

Additionally or alternatively, Map 100b may be configured to represent one or more decision layers indicative of driving options, navigation commands, driving instructions, driving intents, or the like. In some exemplary embodiments, different decision layers may be associated with different specification level, that may be accumulated to motion planning, applied in sequence, or the like. As an example, one layer may be a navigation layer (e.g., where am I and where do I want to go?). Another layer may be a navigational command layer (e.g., in the current environment, given that I know where I want to go, what maneuver should I perform? (i.e. keep lane, change lane, etc.)). As an example, Map 100b may be configured to represent that the vehicle performed a full stop at the stop sign as shown in Map 100a, and may be configured demonstrate a decision to continue driving after the full stop, showing 3 distinct paths: right 150b, forward 160b, and left 170b.

Figure 2A:
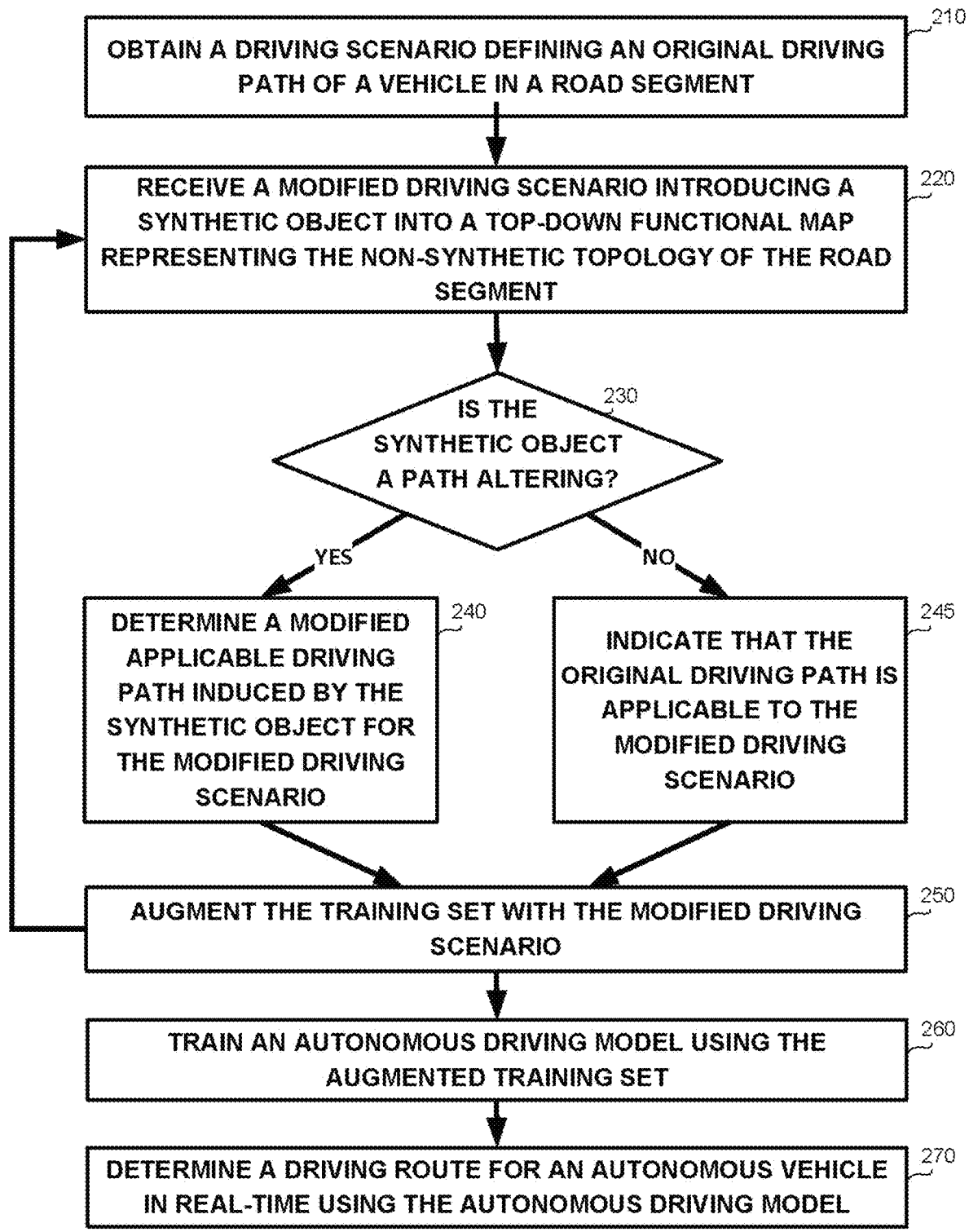
FIGS. 2A-2B show flowchart diagrams of methods, in accordance with some exemplary embodiments of the disclosed subject matter.

Referring now to FIG. 2A showing a flowchart diagram of a method, in accordance with some exemplary embodiments of the disclosed subject matter.

On Step 210, a driving scenario defining an original driving path of a vehicle driving in a road segment may be obtained. In some exemplary embodiments, the driving scenario may comprise a functional map, such as a functional top-down map comprising representations of non-synthetic static topologies of the road segment. Each non-synthetic static topology may be represented using one or more layers, such as a road layer, a stop lines layer, a lane dividers layer, a signs layer, a speed bumps layer, or the like. Additionally or alternatively, the functional map may comprise a static object layer representing static objects potentially physically blocking a path of the vehicle, a dynamic object layer representing dynamic objects with a movement vector potentially colliding with the vehicle, an occlusion layer representing one or more occluded sections within the first road segment, or the like.

In some exemplary embodiments, the driving scenario may be obtained from a training set utilized for training an autonomous driving model. Additionally or alternatively, the driving scenario may be a real driving scenario observed by a system of the autonomous vehicle.

On Step 220, a modified driving scenario may be received. The modified driving scenario may introduce a synthetic object into the functional map. In some exemplary embodiments, the synthetic object may be a dynamic object having a syntactically defined movement vector, such as a moving vehicle, a pedestrian, an animal, or the like. Additionally or alternatively, the synthetic object may be a static object having a syntactically defined location within the road segment, such as a sign, an addition to the road, a static element, or the like.

On Step 230, a determination whether the synthetic object is a path altering object may be performed. In some exemplary embodiments, the synthetic object may be a path altering object if it modifies or compels modification of the original driving path.

In some exemplary embodiments, a path altering object may be a modification to the non-synthetic static topology that may reduce advisability of using the original driving path. As an example, given that the synthetic object is a dynamic object, the syntactically defined movement vector thereof may interfere with the original driving path, thus compelling modification of the driving path to prevent an accident or other undesired situation. As another example, given that the synthetic object is a static object, the original driving path may be altered when the static object creates a physical interference reducing advisability of using the original driving path. It may be noted that the same synthetic object, or objects from the same type, may be path altering when introduced to a first driving scenario, and non-altering in another driving scenario, even when inserted to similar locations, at similar timings, or the like.

Additionally or alternatively, the same synthetic object may be path altering when introduced to the driving scenario in a certain location or a certain timing, but non-altering when inserted to another location or in a different timing.

On Step 240, in response to determining that the synthetic object is a path altering object, a modified applicable driving path induced by the synthetic object may be determined for the modified driving scenario. In some exemplary embodiments, the modified driving scenario may be annotated based on the map representation thereof, e.g., determining the applicable driving path based on the map.

On Step 245, in response to determining that the synthetic object is not a path altering object, indicate that the original driving path is applicable to the modified driving scenario.

On Step 250, the training set may be augmented with the modified driving scenario. A map-based annotated version, such as the modified driving scenario and modified applicable driving path may be added to the training set.

It may be noted that Steps 210-250 may be periodically repeated to generated additional map-based annotated training data and augmenting the training dataset.

On Step 260, an autonomous driving model may be trained using the augmented training set.

On Step 270, the autonomous driving model may be utilized by an autonomous vehicle to determine a driving route in real-time.

Figure 2B:
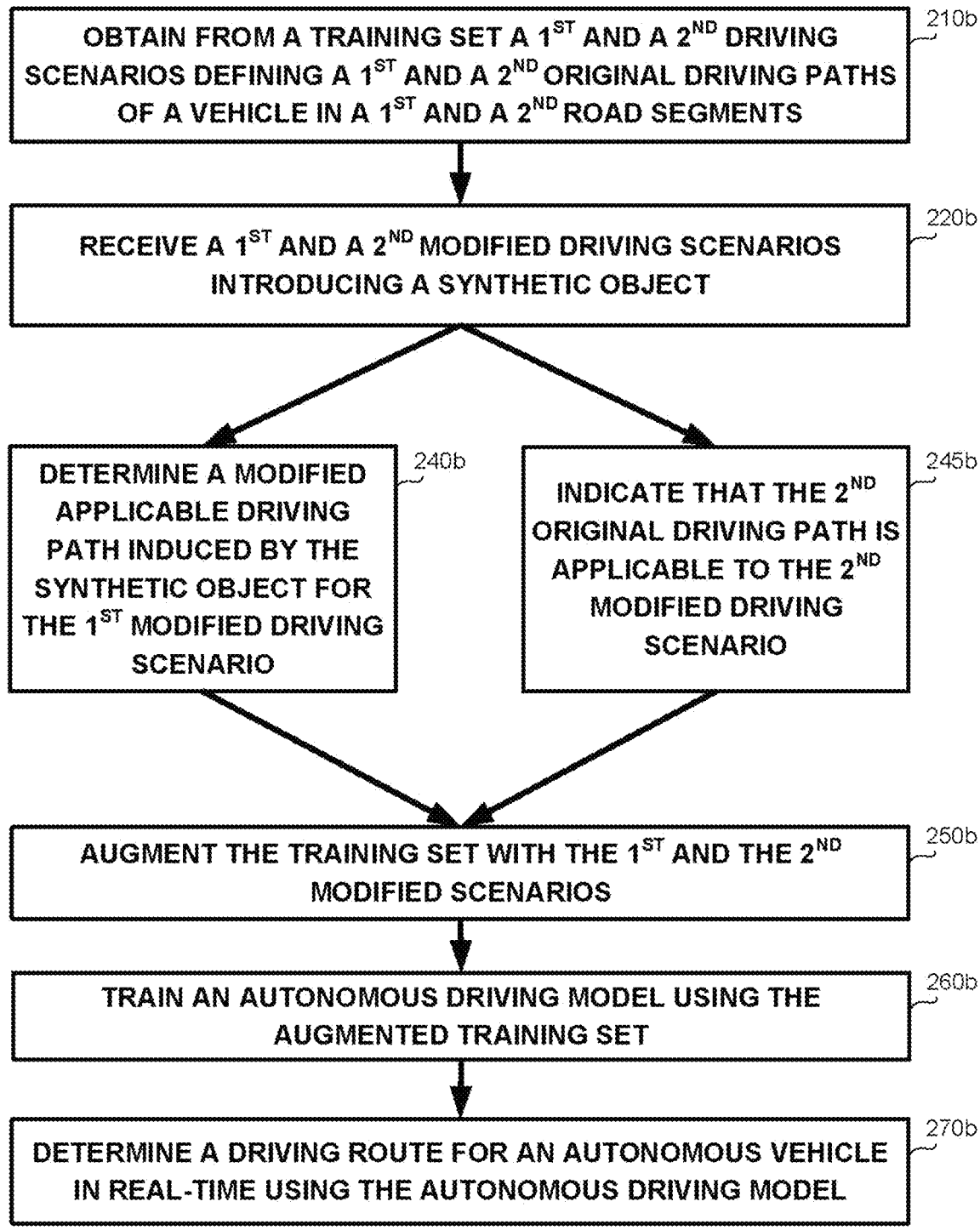

Referring now to FIG. 2B showing a flowchart diagram of a method, in accordance with some exemplary embodiments of the disclosed subject matter.

On Step 210b, a first and a second driving scenarios may be obtained. The first driving scenario may be defining a first original driving path of a vehicle driving in a first road segment. The second driving scenario may be defining a second original driving path of a vehicle driving in a second road segment. Each of the first and second driving scenarios may comprise a functional map comprising representations of non-synthetic static topologies of the first or second road segments, respectively.

On Step 220b, a first and a second modified driving scenarios may be received. The first and second modified driving scenarios may introduce a synthetic object into the functional map of the first and second driving scenarios, respectively. In some exemplary embodiments, the synthetic object may be a path altering object with respect to first driving scenario, and a path non-altering object with respect to the second driving scenario.

On Step 240b, a modified applicable driving path induced by the synthetic object may be determined for the first modified driving scenario.

On Step 245b, indicate that the second original driving path is applicable to the second modified driving scenario.

On Step 250b, the training set may be augmented with the first and second modified driving scenarios.

It may be noted that Steps 210b-250b may be periodically repeated to generated additional map-based annotated training data and augmenting the training dataset.

On Step 260b, an autonomous driving model may be trained using the augmented training set.

On Step 270b, a driving route for an autonomous vehicle may be determined in real-time using the autonomous driving model.

Figure 3A:
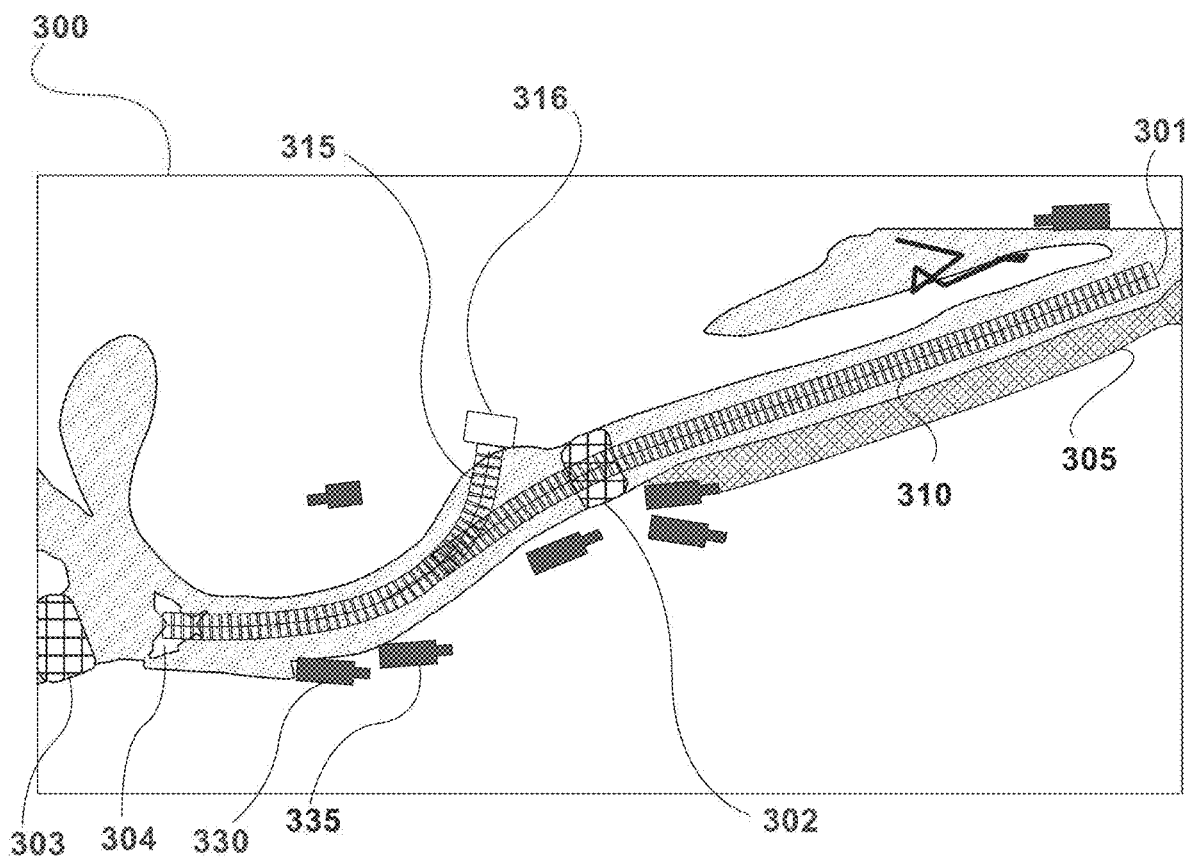
FIGS. 3A-3B show schematic illustration of exemplary functional maps with synthetically added objects, in accordance with some exemplary embodiments of the disclosed subject matter.

Referring now to FIG. 3A showing a schematic illustration of exemplary functional maps with synthetically added objects, in accordance with some exemplary embodiments of the disclosed subject matter.

In some exemplary embodiments, Map 300 may be a functional map representing a driving scenario of a vehicle in a road segment. Map 300 may be a functional top-down map. Map 300 may comprise representations of non-synthetic static topology of the road segment in which the driving scenario occurs, such as a representation of the Road 301, a representation of pedestrian crossing or Crosswalk 302 and 303, a representation of Stop Lines 304, a representation of lane dividers or different lanes (305), representations of signs, speed bumps, or the like.

In some exemplary embodiments, the driving scenario may define a driving path of a vehicle driving in the road segment such as Path 310, other options or optional driving directions, such as in Path 315, or the like. As an example, the driving scenario may exhibit decision-making in an empty roundabout.

In some exemplary embodiments, Map 300 may comprise a representation of static objects potentially physically blocking a path of the vehicle, such as Object 316 blocking Path 315. Additionally or alternatively, Map 300 may comprise a representation of dynamic objects having a movement vector, potentially colliding with the vehicle, such as vehicle 320 driving in Lane 305, other Vehicles 330, or the like.

It may be noted that Map 300 may exhibit an authentic driving scenario, or may be a map-based annotated scenario, that may be generated based on a series of one or more modifications to other driving scenarios. As an example, Object 316 may be a synthetic object inserted to a previous version of the driving scenario, that modifies Driving Path 315. Object 316 may be a static object having a syntactically defined location within the road segment that creates a physical interference reducing advisability of using the original driving path (e.g., Driving Path 315 would have been continued). As another example, the path altering object may be a modification to the non-synthetic static topology of the road segment (such as 345) that reduces advisability of using an original driving path, or generating an occluded section within the road segment, such as Section 340, in which the vehicle cannot drive.

Figure 3B:
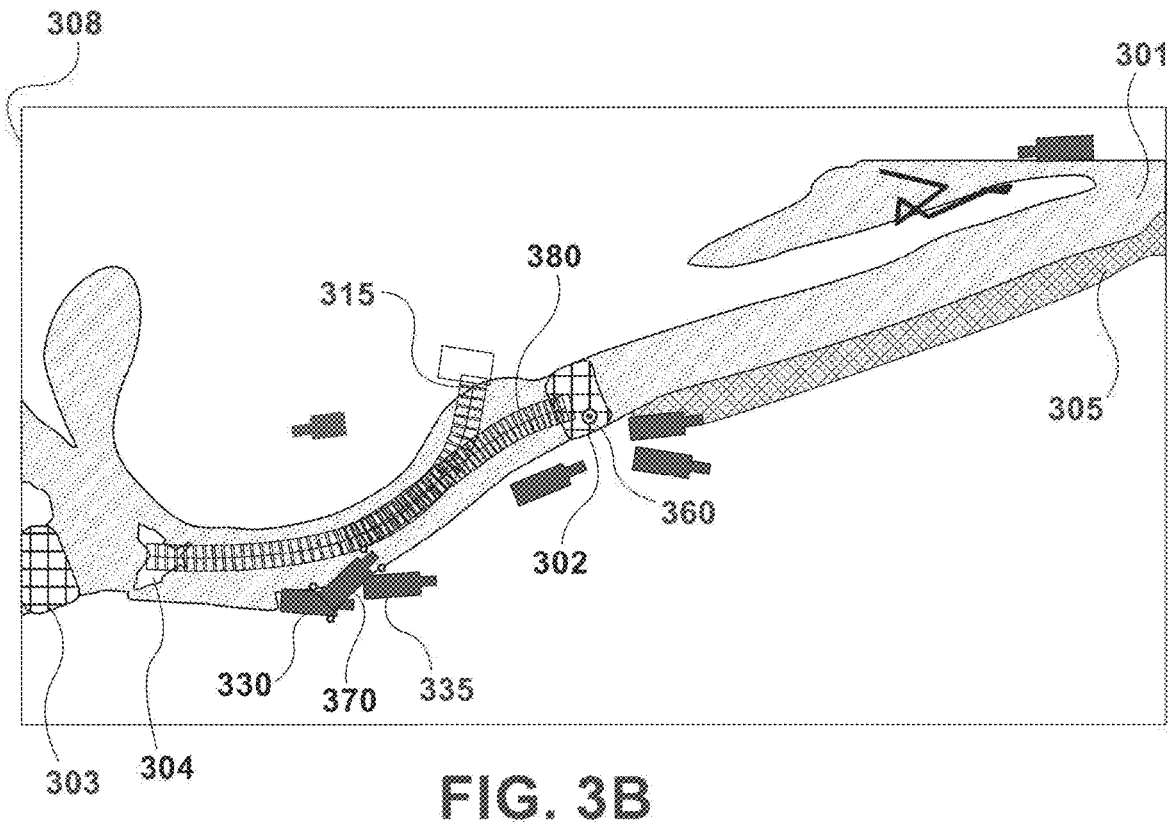

Referring now to FIG. 3B showing a schematic illustration of exemplary functional maps with synthetically added objects, in accordance with some exemplary embodiments of the disclosed subject matter.

In some exemplary embodiments, Map 350 may be a modified functional map representing a modified driving scenario generated as a modification of the driving scenario represented by Map 300. Map 350 may be a top-down map. Map 350 may be generated by introducing a synthetic object into Map 300, such as a Pedestrian 360, a moving Vehicle 370, or the like.

In some exemplary embodiments, the synthetic object, such as Pedestrian 360, may be a path altering object, that induces a different Driving Path 380, in which the vehicle is required to make a full stop before Crosswalk 302. Pedestrian 360 may be a dynamic object having a syntactically defined movement vector interfering with Driving Path 310, thus required to be changed. Driving Path 380 may be different than the original Driving Path 310a, and may be annotated based on the modification on Map 300 as represented in Map 350. Additionally or alternatively, the synthetic object, such as Vehicle 370 may be a path non-altering object for paths 310 and 315, as the movement vector thereof may not collide with the vehicle when being in that certain location within Driving Path 310. However, if Vehicle 370 has been inserted to Map 350 in a different location colliding with the vehicle, with a different movement vector interfering with Driving Path 310, or at a different timing (e.g., when the vehicle is still located nearby the location of Vehicle 370), Vehicle 370 would have been a path altering object. Additionally or alternatively, Vehicle 370 may be a path-altering object with respect to other driving scenarios of other vehicles within the road segment, such as Vehicles 330.

It may be noted that however Map 350 exhibits different optional modifications to the driving scenario represented in Map 300, a single synthetic object may be added and annotated in each case to generate the modified scenario.

Figure 4:
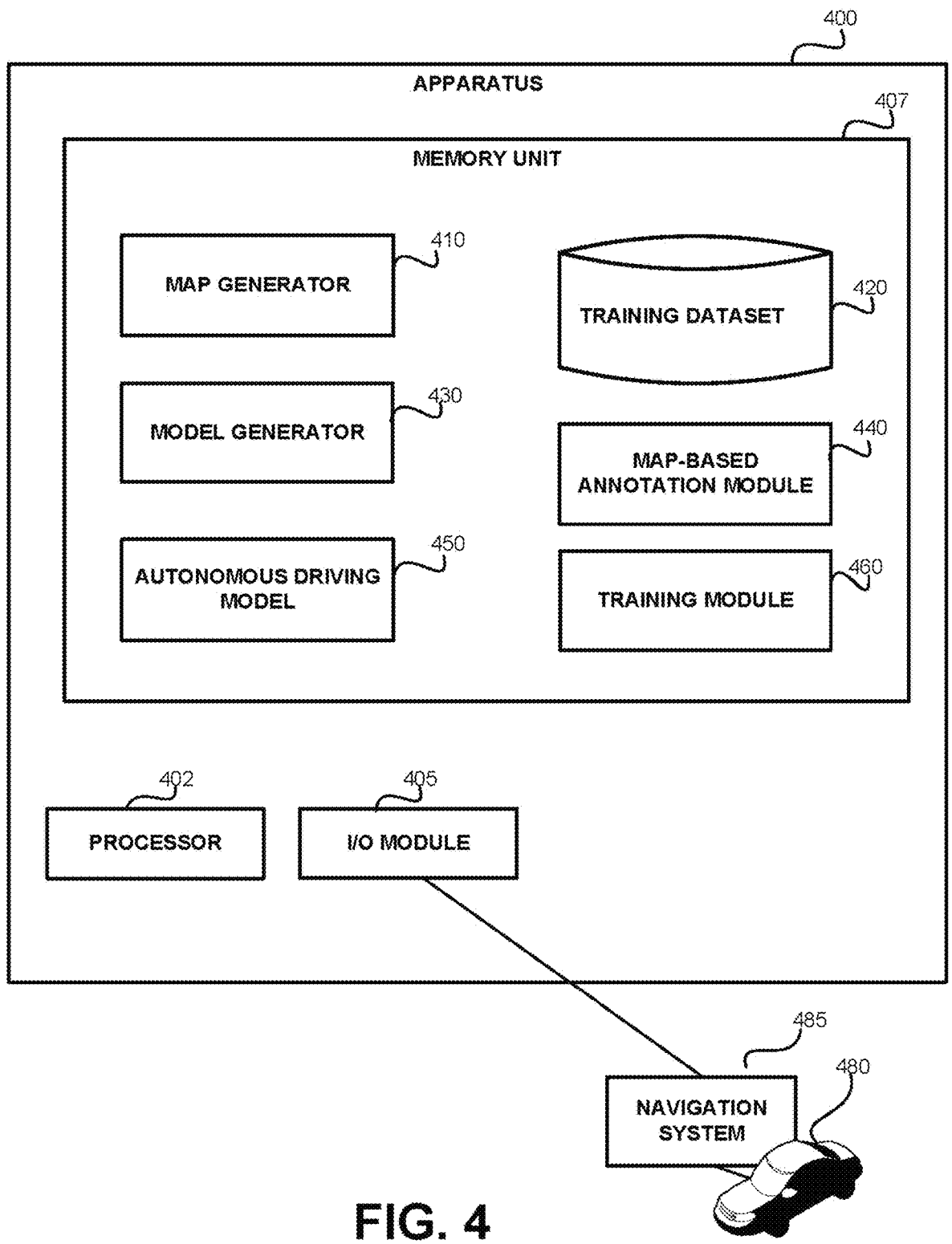
FIG. 4 shows a block diagram of an apparatuses, in accordance with some exemplary embodiments of the disclosed subject matter.

Referring now to FIG. 4 showing a block diagram of an apparatus, in accordance with some exemplary embodiments of the disclosed subject matter. An Apparatus 400 may be configured to support generation of models for generating functional road maps for autonomous vehicles, in accordance with the disclosed subject matter.

In some exemplary embodiments, Apparatus 400 may comprise one or more Processor(s) 402. Processor 402 may be a Central Processing Unit (CPU), a microprocessor, an electronic circuit, an Integrated Circuit (IC) or the like. Processor 402 may be utilized to perform computations required by Apparatus 400 or any of its subcomponents.

In some exemplary embodiments of the disclosed subject matter, Apparatus 400 may comprise an Input/Output (I/O) module 405. I/O Module 405 may be utilized to provide an output to and receive input from a user, a device, a sensor, or the like, such as, for example receiving an input from one or more sensors of Connected Cars 450, providing output for one or systems of Connected Cars 450, or the like.

In some exemplary embodiments, Apparatus 400 may comprise a Memory 407. Memory 407 may be a hard disk drive, a Flash disk, a Random Access Memory (RAM), a memory chip, or the like. In some exemplary embodiments, Memory 407 may retain program code operative to cause Processor 402 to perform acts associated with any of the subcomponents of Apparatus 400.

In some exemplary embodiments, Map Generator 410 may be configured to generate a functional map of the road ahead of an autonomous vehicle, such as one or more of autonomous Vehicles 480. Maps generated by Map Generator 410 may be top-down maps. The functional maps may be represented in a functional manner using functional features relevant to assisting the autonomous navigation of an autonomous vehicle within the map. Each pixel in the generated functional map may be associated with a predetermined relative position to autonomous Vehicle 480. A content of each pixel in the generated functional map may be assigned a set of values, each of which represents a functional feature relating to a location at a corresponding predetermined relative position to the pixel.

In some exemplary embodiments, Map Generator 410 may be configured to process real-time input provided by sensors of autonomous Vehicles 480 to generate the functional map without relying on a pre-determined precise mapping or other information obtained using GPS. In some exemplary embodiments, the functional map may be configured to provide functional information useful for Navigation System 485 to perform autonomous driving of the vehicle of autonomous Vehicle 480. Navigation System 485 may autonomously drive autonomous Vehicle 480 in accordance with functional features represented by the generated functional map, according to an autonomous driving model generated by Model Generator 430.

In some exemplary embodiments, functional map generated by Map Generator 410 may be a multi-layer map. Each layer may represent a different component of the driving scenario, a different functional feature, or the like. The functional map may comprise multiple layers representing the non-synthetic static topology of the road segment, such as roads, lanes, stop lines, lane dividers, signs, speed bumps, or the like. Additionally or alternatively, the functional map may comprise one or more layers representing static objects potentially physically blocking a path of the vehicle, such as barriers, obstacles, poles, traffic cones, parked vehicles, or the like. Additionally or alternatively, the functional map may comprise one or more layers representing dynamic objects with a movement vector, potentially colliding with the vehicle, such as other vehicles, two-wheelers, trucks, buses, pedestrians, animals, or the like. Additionally or alternatively, the functional map may comprise one or more occlusion layers representing one or more occluded sections or regions within the road segment. The occlusion may be caused by a physical element, such as an irregularly parked vehicle, a rock, or the like; by a physical condition of the road, such as damage, deterioration, vandalized sections, or the like. Additionally or alternatively, the occlusion may be caused be an implicit condition generated by a traffic sign, instruction, an element causing visual impairment, such as buildings, large vehicles (trucks and buses), weather and light conditions (e.g., fog), automatic gates & barriers, large groups of pedestrians on crosswalks, or the like In some exemplary embodiments, functional map generated by Map Generator 410 may comprise possible direction layers representing applicable driving paths, such as driving to the left/right label, driving straight, an all-paths applicable indication, or the like. Additionally or alternatively, functional map generated by Map Generator 410 may comprise an aggregated decision layer representing possible direction of applicable driving paths, such as a Keep Lane, Right/Left Turn, Right/Left Lane Switch, Park straight label, a left label, a right label, an all-paths label, or the like. Additionally or alternatively, functional map generated by Map Generator 410 may comprise an instruction layer, such as instructing the vehicle to make a full stop, a sudden stop, or the like. It may be noted that a functional map representation may represent an aggregation of multiple driving scenarios associated with the road segment.

In some exemplary embodiments, Model Generator 430 may be configured to utilize data from Training Dataset 420 to generate and train Autonomous Driving Model 450. Model Generator 430 may be configured to utilize a Map-Based Annotation Module 440 to syntactically generate and annotate training data cases.

In some exemplary embodiments, Map-Based Annotation Module 440 may obtain a driving scenario and an associated functional map representing the driving scenario, such as a functional top-down map. The functional map may comprise a representation of a non-synthetic static topology of a road segment. The driving scenario may define an original driving path of a vehicle driving in the road segment.

In some exemplary embodiments, Map-Based Annotation Module 440 may be configured to generate a modified driving scenario defining a driving path based on an existing driving scenario. In some exemplary embodiments, Map-Based Annotation Module 440 may be configured to generate the modified driving scenario by introducing a synthetic object into the functional map associated with the original driving scenario. In some exemplary embodiments, the synthetic object may be a path altering object that induces a driving path that is different than the original driving path. Additionally or alternatively, the synthetic object may be a path non-altering object that does not modify the original driving path (e.g., keeps the original driving path applicable in the modified driving scenario). In some exemplary embodiments, Map-Based Annotation Module 440 may introduce synthetic objects that are already classified as path-altering objects, and automatically determine whether the synthetic object, when introduced into a certain location at a certain timing into the driving scenario may affect the driving path. In some exemplary embodiments, Annotation Module 440 may be configured to implicitly select path-altering objects based on previously annotated data (e.g. a pedestrian in front of us that causes out path to cut short before them is a path-altering objects), or the like.

In some exemplary embodiments, path altering objects added by Map-Based Annotation Module 440 may be dynamic object having syntactically defined movement vectors that may interfere with the original driving path. In some exemplary embodiments, a layer representing the path altering object may be added to the original functional map. As an example, a layer simulating far pedestrians running towards the original driving path forcing a slow-down may be added to the map. As another example, the added layer may be layer simulating emergency situations that necessitate unconventional decisions (like swerving away from fast oncoming vehicles that enter the driving lane by mistake). Additionally or alternatively, path altering objects added by Map-Based Annotation Module 440, may be static objects having a syntactically defined location within the road segment, that may create a physical interference reducing advisability of using the original driving path.

Additionally or alternatively, path altering objects added by Map-Based Annotation Module 440 may be modifications to the non-synthetic static topology that reduces advisability of using the original driving path, such as blocking a road, adding a traffic sign (such as a no-entrance sign), or the like. As an example, the path altering object may be a large vehicle blocking a current lane necessitating a lane switch, placing "No Entry" signs at intersection exits to prevent us driving there, placing a "Stop Sign" at intersection entrances to force a stop, or the like.

In some exemplary embodiments, Map-Based Annotation Module 440 may be configured to annotate the training dataset with a binary label, e.g., indicating whether the original driving path is applicable within the modified driving scenario or not. Additionally or alternatively, Map-Based Annotation Module 440 may be configured to determine the modified driving path in case of determining that the synthetically added object is a path-altering object, such as using Neural Networks, navigation models, or the like. The modified driving path may be represented in a modified functional map representation of the road segment, in accordance with the modified driving scenario. The modified functional map representation may comprise a new aggregated decision layer representing possible direction of the modified driving path, a modification to a recent aggregated decision layer, or the like.

In some exemplary embodiments, Training Module 460 may be configured to train Autonomous Driving Model 450. Autonomous Driving Model 450 may be configured to provide a predicted driving path within a road segment based on a functional map representation of the road segment. For each modified driving scenario, Training Module 445 may be configured to indicate to Model 450 whether the original driving path is applicable, or define a new driving path.

In some exemplary embodiments, Autonomous Driving Model 450 may be trained using Training Dataset 420. Training Dataset 420 may comprise original driving scenarios defining real driving scenarios, such as obtained from autonomous vehicles systems, manually annotated scenarios, or the like. Additionally or alternatively, Training Dataset 420 may comprise map based annotated modified scenarios generated by Modification Module 435. It may be noted that Training Dataset 420 may be continuously augmented with map based annotated modified scenarios generated by Map-Based Annotation Module 440, some of which affect the original driving path and some of which do not affect the original driving path.

In some exemplary embodiments, Autonomous Driving Model 450 may be provided to one or more connected autonomous Vehicles 480 via I/O Module 405, to be utilized by a Navigation System 485 of an autonomous Vehicle 480 to determine a driving route in real-time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
obtaining a first driving scenario, wherein the first driving scenario comprises a first functional map comprising at least a representation of a first non-synthetic static topology of a first road segment, whereby defining a first original driving path of a vehicle driving in the first road segment;
receiving a first modified driving scenario and a first driving path, wherein the first driving path is applicable within the first modified driving scenario, wherein the first modified driving scenario is defined based on the first driving scenario, wherein the first modified driving scenario introduces a path altering object into the first functional map, wherein the path altering object is a synthetic object, wherein the path altering object induces the first driving path that is different than the first original driving path;
obtaining a second driving scenario, wherein the second driving scenario comprises a second functional map comprising at least a representation of a second non-synthetic static topology of a second road segment, whereby defining a second original driving path of a vehicle driving in the second road segment;
receiving a second modified driving scenario, wherein the second modified driving scenario introduces a path non-altering object into the second functional map, wherein the path non-altering object is a synthetic object, whereby the second original driving path is applicable in the second modified driving scenario;
training an autonomous driving model, wherein the autonomous driving model is configured to provide a predicted driving path within a road segment based on a functional map representation of the road segment, wherein said training comprises:
  indicating to the autonomous driving model that the first driving path is applicable to the first modified driving scenario; and
  indicating to the autonomous driving model that the second original driving path is applicable to the second modified driving scenario,
  whereby augmenting an original training set with map based annotated modified scenarios at least one of which affects a driving path and at least one of which does not affect a driving path.

2. The method of claim 1 further comprises utilizing the autonomous driving model by an autonomous vehicle to determine a driving route in real-time.

3. The method of claim 1, wherein the first non-synthetic static topology comprises at least one of:
  a road layer;
  a stop lines layer;
  a lane dividers layer;
  a signs layer; and
  a speed bumps layer.

4. The method of claim 1, wherein the first functional map comprises at least one of:
  a static object layer representing static objects potentially physically blocking a path of the vehicle;
  a dynamic object layer representing dynamic objects with a movement vector, potentially colliding with the vehicle; and
  an occlusion layer representing one or more occluded sections within the first road segment.

5. The method of claim 1, wherein the path altering object is a dynamic object having a syntactically defined movement vector, whereby the syntactically defined movement vector interfering with the first original driving path.

6. The method of claim 1, wherein the path altering object is a static object having a syntactically defined location within the first road segment, whereby the static object creating a physical interference reducing advisability of using the first original driving path.

7. The method claim 1, wherein the path altering object is a modification to the first non-synthetic static topology that reduces advisability of using the first original driving path.

8. The method of claim 1, wherein the path altering object and the path non-altering object are identical.

9. The method of claim 1, further comprises:
  receiving a third modified driving scenario and a third driving path, wherein the third driving path is applicable within the third modified driving scenario, wherein the third modified driving scenario is defined based on the third driving scenario, wherein the third modified driving scenario introduces a third path altering object into the first functional map, wherein the third path altering object is a synthetic object, wherein the third path altering object induces the third driving path that is different than the first original driving path and the first driving path;
  wherein said training further comprises:
    indicating to the autonomous driving model that the third driving path is applicable to the third modified driving scenario.

10. The method of claim 1, further comprises:
  receiving a third modified driving scenario, wherein the third modified driving scenario introduces a third path non-altering object into the first functional map, wherein the third path non-altering object is a synthetic object, wherein a type of the third path non-altering object is similar to a type of the path altering object, whereby the first original driving path is applicable in the third modified driving scenario;
  wherein said training further comprises:
    indicating to the autonomous driving model that the first original driving path is applicable to the third modified driving scenario.

11. The method of claim 10, wherein the third path non-altering object is identical to the path altering object, wherein a location of the third path non-altering object within the first functional map is different than a location of the path altering object within the first functional map.

12. The method of claim 1, wherein the first functional map further comprises a layer representing driving information of the vehicle in a most recent timeframe.

13. The method of claim 1, wherein the functional map representation of the road segment comprises an aggregated decision layer representing possible direction of applicable driving paths, wherein the aggregated decision layer comprises at least one of: a straight label, a left label and an all-paths label.

14. The method of claim 1, wherein the functional map representation represents an aggregation of multiple driving scenarios associated with the road segment.

15. A computerized apparatus having a processor, the processor being adapted to perform the steps of:
  obtaining a first driving scenario, wherein the first driving scenario comprises a first functional map comprising at least a representation of a first non-synthetic static topology of a first road segment, whereby defining a first original driving path of a vehicle driving in the first road segment;
  receiving a first modified driving scenario and a first driving path, wherein the first driving path is applicable within the first modified driving scenario, wherein the first modified driving scenario is defined based on the first driving scenario, wherein the first modified driving scenario introduces a path altering object into the first functional map, wherein the path altering object is a synthetic object, wherein the path altering object induces the first driving path that is different than the first original driving path;
  obtaining a second driving scenario, wherein the second driving scenario comprises a second functional map comprising at least a representation of a second non-synthetic static topology of a second road segment, whereby defining a second original driving path of a vehicle driving in the second road segment;
  receiving a second modified driving scenario, wherein the second modified driving scenario introduces a path non-altering object into the second functional map, wherein the path non-altering object is a synthetic object, whereby the second original driving path is applicable in the second modified driving scenario;
  training an autonomous driving model, wherein the autonomous driving model is configured to provide a predicted driving path within a road segment based on a functional map representation of the road segment, wherein said training comprises:
    indicating to the autonomous driving model that the first driving path is applicable to the first modified driving scenario; and
    indicating to the autonomous driving model that the second original driving path is applicable to the second modified driving scenario, whereby augmenting an original training set with map based annotated modified scenarios at least one of which affects a driving path and at least one of which does not affect a driving path.

16. A computer program product comprising a non-transitory computer readable storage medium retaining program instructions, which program instructions when read by a processor, cause the processor to perform a method comprising:

obtaining a first driving scenario, wherein the first driving scenario comprises a first functional map comprising at least a representation of a first non-synthetic static topology of a first road segment, whereby defining a first original driving path of a vehicle driving in the first road segment;

receiving a first modified driving scenario and a first driving path, wherein the first driving path is applicable within the first modified driving scenario, wherein the first modified driving scenario is defined based on the first driving scenario, wherein the first modified driving scenario introduces a path altering object into the first functional map, wherein the path altering object is a synthetic object, wherein the path altering object induces the first driving path that is different than the first original driving path;

obtaining a second driving scenario, wherein the second driving scenario comprises a second functional map comprising at least a representation of a second non-synthetic static topology of a second road segment, whereby defining a second original driving path of a vehicle driving in the second road segment;

receiving a second modified driving scenario, wherein the second modified driving scenario introduces a path non-altering object into the second functional map, wherein the path non-altering object is a synthetic object, whereby the second original driving path is applicable in the second modified driving scenario;

training an autonomous driving model, wherein the autonomous driving model is configured to provide a predicted driving path within a road segment based on a functional map representation of the road segment, wherein said training comprises:

indicating to the autonomous driving model that the first driving path is applicable to the first modified driving scenario; and indicating to the autonomous driving model that the second original driving path is applicable to the second modified driving scenario, whereby augmenting an original training set with map based annotated modified scenarios at least one of which affects a driving path and at least one of which does not affect a driving path.

* * * * *